United States Patent [19]
Varda

[11] Patent Number: 5,465,522
[45] Date of Patent: Nov. 14, 1995

[54] MINNOW SCOOP

[76] Inventor: Alan J. Varda, P.O. Box 2304, Kingsford, Mich. 49802

[21] Appl. No.: 290,214

[22] Filed: Aug. 15, 1994

Related U.S. Application Data

[63] Continuation of Ser. No. 59,645, May 10, 1993, abandoned.
[51] Int. Cl.$^6$ ............................................. A01K 97/04
[52] U.S. Cl. ........................................ 43/4; 43/11; 43/55
[58] Field of Search ................................. 43/4, 55, 11

[56] References Cited

U.S. PATENT DOCUMENTS

| | | |
|---|---|---|
| 2,480,924 | 9/1949 | Heger . |
| 2,502,816 | 4/1950 | Bennek . |
| 2,531,551 | 11/1950 | Brecht et al. . |
| 2,611,982 | 9/1952 | Sears . |
| 2,982,045 | 5/1961 | Highland . |
| 3,059,369 | 10/1962 | Swanson . |
| 3,065,561 | 11/1962 | Swanson . |
| 3,308,570 | 3/1967 | Horton . |
| 3,541,722 | 11/1970 | Garrison ..................................... 43/66 |
| 3,753,308 | 8/1973 | Swanson . |
| 3,803,743 | 4/1974 | Nelepka . |
| 3,949,510 | 4/1976 | Johnson ....................................... 43/4 |
| 3,958,356 | 5/1976 | Clingan . |
| 4,048,742 | 9/1977 | Clingan . |
| 4,060,923 | 12/1977 | Schmitz . |
| 4,118,807 | 10/1978 | McCauley . |
| 4,815,230 | 3/1989 | Allen ........................................ 43/55 |

*Primary Examiner*—Kurt Rowan
*Attorney, Agent, or Firm*—Varnum, Riddering, Schmidt & Howlett

[57] ABSTRACT

This invention relates to fishing gear in the form of a minnow caddy. The minnow caddy has a main caddy body which is opaque (black) and forms a hiding place for a minnow or like bait fish into which the bait fish will swim when the minnow caddy is placed in a bait receptacle. The main caddy body having an entrance end and an exit end is carried by a control handle which permits the positioning of the main caddy body within the bait receptacle. At the exit end of the main caddy body there is an exit opening in which there is positioned a hooking aperture body having a monoleaf spring gate with opposed monoleaf springs. When the minnow caddy is lifted out of the bait receptacle, seeing the light at the exit opening provided by the transparent hooking aperture body window, the bait fish will be forced through the exit opening in a generally head first and right side up position by the water where it becomes trapped in a position wherein it is feasible to engage the bait fish with a fish hook in a normal, easy manner and thereafter draw the hooked bait fish out through the exit end of the hooking aperture body thereby separating the monoleaf springs of the monoleaf spring gate.

21 Claims, 5 Drawing Sheets

5,465,522

MINNOW SCOOP

This is a continuation of application Ser. No. 08/059,645, filed May 10, 1993, now abandoned.

BACKGROUND OF THE INVENTION

1. Field of the Invention

This invention relates in general to new and useful improvements in fishing gear, and more particularly to a minnow or like bait fish handling device which receives and holds a minnow and like bait fish in a position for receiving a fish hook.

2. State of the Prior Art

Live bait fish are carried by fisherman in a bucket of water or like bait fish receptacle. A fisherman must chase the bait fish within the bucket and after he catches one of the bait fish, he must hold it firmly in his hand while putting the fish hook into the bait fish. Frequently, the net result is that the bait fish jumps out of the fisherman's hand into the boat or into the water on which the boat is floating. Also, the close proximity of the bait fish to the fisherman's hand often results in the fisherman injuring himself with the hook when he attempts to hook the fish. Therefore, there is a need for a device that aids the fisherman in not only catching a bait fish, but 31 to safely hold the bait fish while inserting the hook.

The prior art discloses several devices which are directed to catching bait fish and hold them for the insertion of a hook. However, each prior art device is unsatisfactory. For example, the U.S. Pat. Nos. 4,048,742, issued Sep. 20, 1977, and 3,958,356, issued May 25, 1976, disclose a minnow scoop having an elongated handle which is connected to a clear plastic, wedge-shaped enclosed body. The wedge-shaped body has a pivotally mounted front wall with finger portions and a hinged, floating back door. When the minnow scoop is inserted into the bait bucket, the floating back door opens and bait fish will hopefully swim into the wedge-shaped body and the fisherman will remove the minnow scoop from the water and hook the fish through the fingers of the front will. However, there is no way for the fisherman to hold the fish in position for easily inserting the hook. Furthermore, the fisherman must wait until by happenstance a bait fish swims into the minnow scoop.

U.S. Pat. Nos. 4,060,923, issued Dec. 6, 1977; 3,803,743, issued Apr. 16, 1974; 3,753,308, issued Aug. 21, 1973; 3,065,561, issued Nov. 27, 1962; 3,059,369, issued Oct. 23, 1962; 2,531,551, issued Nov. 28, 1950; and 2,480,924, issued Sep. 6, 1949; all disclose generally a dipper-type minnow scoop having a handle connected to an open top scoop or funnel-shaped container with openings in the device for insertion of the hook into the bait fish. However, each of these devices require active and specific manipulation by the fisherman in order to catch the bait fish within the scoop prior to hooking the bait fish. The fisherman wastes too much time trying to catch the fish with the scoop.

U.S. Pat. Nos. 4,118,807, issued Oct. 10, 1978 and 3,541,722, issued Mar. 24, 1969, are directed to a minnow dipper or trap comprising a black body portion having an opening for the passage of fish and an exit opening that terminates in a clear or transparent trap. The trap is provided with means for hooking the bait fish caught in the trap and removing the bait fish from the trap. The black color of the housing lures the fish into the minnow-dipper or trap. When the minnow dipper or trap is moved, the clear or transparent trap is perceived as an escape opening into which the fish swims where it is held until hooked. However, each of these devices does not provide for hooking the bait fish in the head and dorsal area. Also, each of these devices does not have interchangeable trap portions of different sizes to accommodate different size bait fish. Moreover, each of these scoops do not rest on the bottom of the bait container and the bait fish will naturally congregate under the scoop instead of swimming into the scoop. This is true even if the scoops were placed on the bottom of the bait container because the prior art scoops are shaped so they do not lie flat against the bottom.

SUMMARY OF INVENTION

In accordance with the invention, a minnow scoop is provided for catching and holding bait fish by luring the bait fish into the minnow scoop, which then securely holds the bait fish so it can be easily hooked by the fisherman. The minnow scoop comprises a main caddy body, which is preferably of a dark or substantially opaque color. The main caddy body provides what appears to be a hiding place for the bait fish. The caddy body has an exit opening, which carries a hooking aperture body that is actually a trap and is preferably transparent. The hooking aperture body appears to the bait fish within the caddy body to be an exit. When the caddy body is lifted by the fisherman, the combination of gravity and water exiting through the hooking aperture body forces the bait fish into the hooking aperture body. The hooking aperture body preferably has a monoleaf spring aperture gate that includes multiple monoleaf springs with suitable openings for receiving a fish hook that is passed through the bait fish. These springs are sufficiently resilient to flex and permit the withdrawal of a hooked bait fish.

The minnow scoop also includes a control handle by way of which the main caddy body can be positioned normally on the bottom of the bait container and removed from the bait container with the caddy body containing the bait fish.

The minnow scoop can be provided with several different interchangeable hooking aperture bodies for receiving bait fish of different sizes.

In another aspect of the invention, the minnow scoop comprises a caddy body having an opening on one end and an exit on the other end. The hooking aperture body is replaceably carried by the caddy body and comprises multiple monoleaf springs used to trap and hold a bait fish exiting the caddy body. The gate further has grooves that receive a hook, which are used to hook a trapped bait fish.

Width the above and other objects in view that will hereinafter appear, the nature of the invention will be more clearly understood by reference to the following detailed description, the appended claims, and the several views illustrated in the accompanying drawings.

DESCRIPTION OF THE PREFERRED EMBODIMENTS

Figure 1:
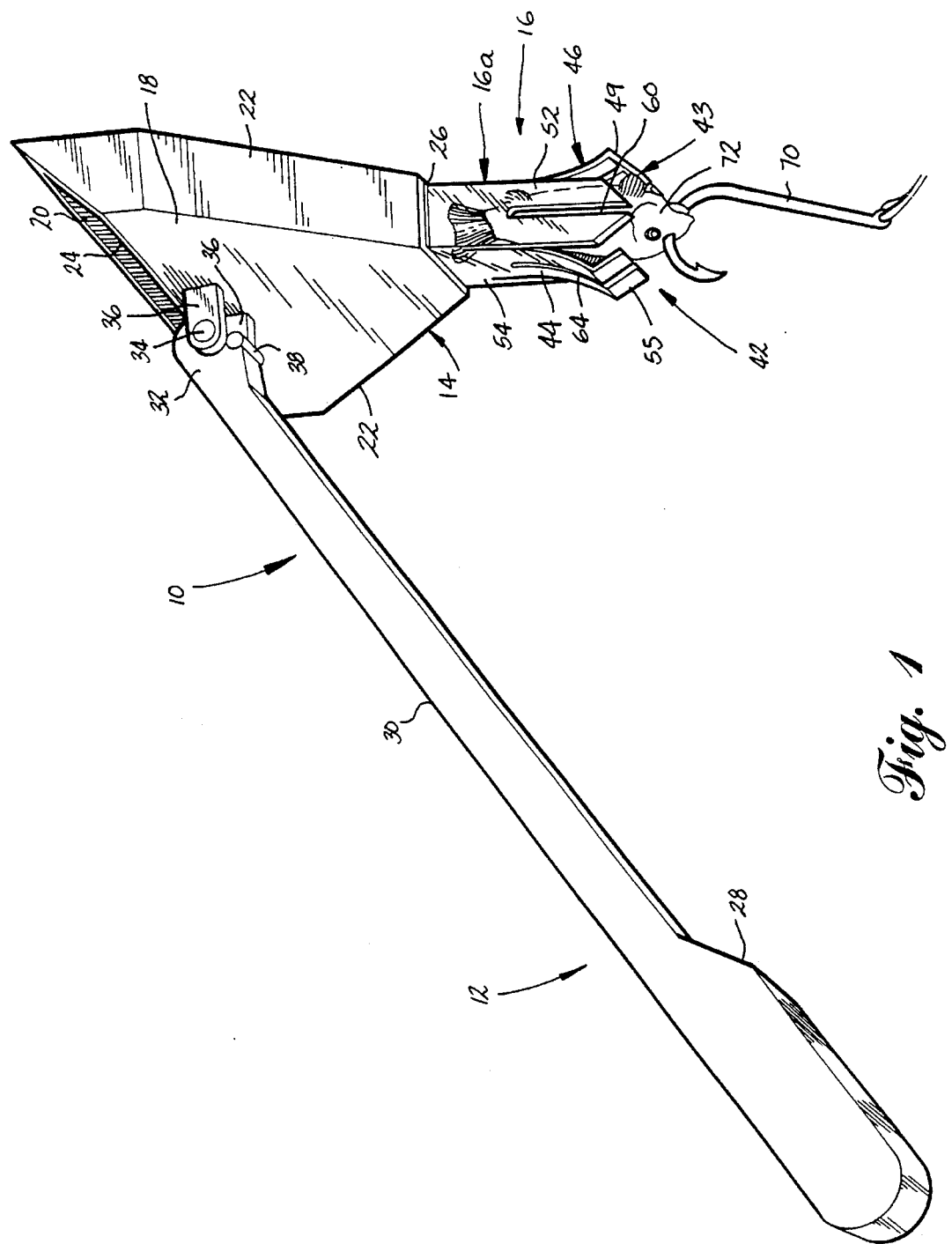
FIG. 1 is a top perspective view of a minnow caddy formed in accordance with this invention and shows the same equipped with a large size hooking aperture body.

Referring now to the drawings in detail, reference is first made to FIG. 1 wherein there is illustrated a minnow caddy formed in accordance with this invention and generally identified by the numeral 10. The minnow caddy 10 is of a three piece construction, as previously described, and includes a control handle 12, a main caddy body 14, and a hooking aperture body 16. All three components of the minnow caddy 10 are primarily formed of a suitable plastic material but a suitable metal can also be used.

The main caddy body 14 is preferably formed of a black or other substantially opaque plastic and includes a top wall 18 and a bottom wall 20, which are joined together by side walls 22. The main caddy body 14 is of a uniform height and has a wide entrance opening 24 and a much smaller exit opening 26. Preferably, the bottom wall 20 is longer than the top wall 18 so as to facilitate the entrance of a bait fish into the entrance opening 24 when the main caddy body 14 is seated on the bottom of a bait receptacle or container. The bottom wall 20 is also preferably flat so the main caddy body 14 lies flat against the bottom of the bait container so the fish cannot congregate beneath the main caddy body. It has been shown that if the main caddy body is positioned above the bottom of the bait fish container the bait fish prefer to congregate under the main caddy body 14 instead of swimming into the main caddy body 14. However, if the main caddy body 14 is placed flat against the bottom of the bait container, the bait fish immediately swim into the main caddy body 14.

The main caddy body 14 is carried by the control handle 12, which includes an upper gripping end 28, an elongated shank 30, and a connecting portion 32, which is connected to the main caddy body 14 for pivotal movement by a horizontal pivot pin 34 which passes through a pair of spaced parallel upstanding mounting ears 36, mounted to the main caddy body 14. The pivoting of the control handle 12 relative to the main caddy body 14 is restricted by a small bar 38 carried by the control handle 12 for engaging rear edges of the mounting ears 36 in the manner best shown in FIGS. 1 and 3. The control handle 12 is opaque and is preferably black in color.

Referring to FIGS. 1 and 4–8, the minnow caddy 10 has a hooking aperture body 16 for trapping and holding a bait fish. For a particular size main caddy body 14, multiple hooking aperture bodies, as shown in FIGS. 1, 3, 4 and 7, can be removably mounted to the main caddy body. Preferably, the multiple hooking aperture bodies have a substantially identical external size to facilitate the manufacturing of the hooking aperture bodies and the mounting of the hooking aperture bodies to the main caddy body. Although the external size of the varied hooking aperture bodies is substantially identical, the internal size of the hooking aperture bodies can be varied to accommodate different size bait fish.

Figure 3:
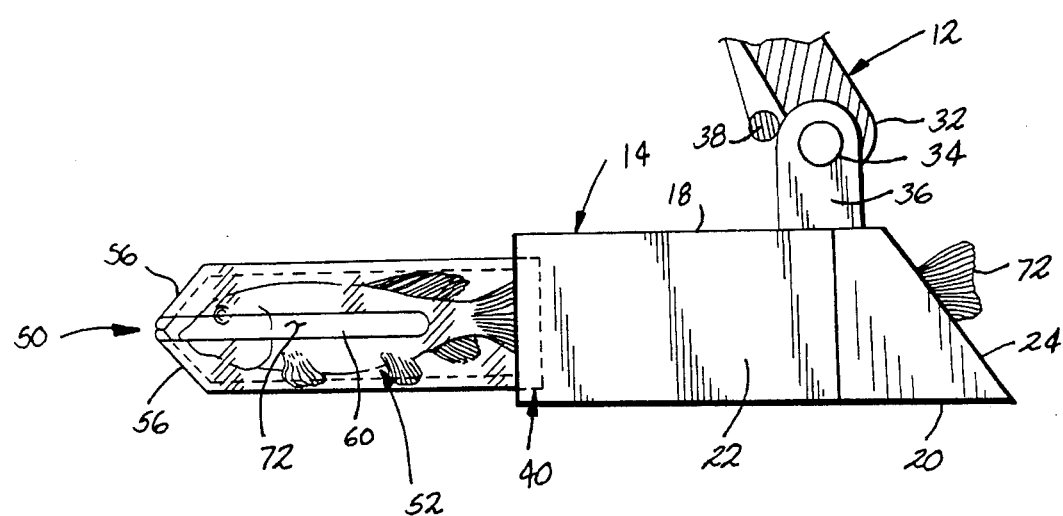
FIG. 3 is a side elevational view of the minnow caddy with the upper part of the handle broken away and the main caddy body provided with a hooking aperture body similar to that of FIG. 1.
Figure 4:
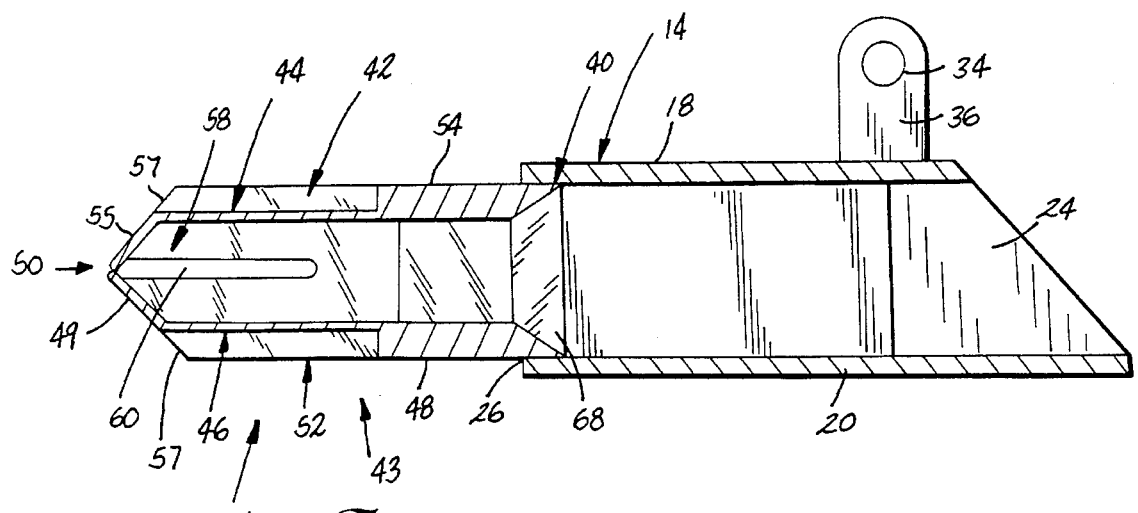
FIG. 4 is a longitudinal vertical sectional view taken generally along the line 4—4 of FIG. 2 and shows the relationship between the hooking aperture body and the main caddy body as well as more specifically the details of the monoleaf spring gate.

Three hooking aperture bodies of different internal sizes are shown In FIGS. 1,3,4 and 7. However, there could be as many different sizes of hooking aperture bodies as there are different sizes of bait fish. The largest hooking aperture body 16a, which is shown in FIGS. 1 and 3, will be of a length to receive a minnow having a length between three inch and four inches with such minnow being suitable bait fish for Northern Pike, Muskie and large Walleye. The hooking aperture body 16b of FIG. 4 is of the same external size as hooking aperture body 16a, but of a smaller internal size and is adapted for use with fingerlings of a length varying from two inches to three inches with fingerlings being a suitable bait for most popular perch and walleye. Finally, the hooking aperture body shown in FIG. 7 and identified by the reference numeral 16c will be of an internal size for receiving bait fish having a length ranging from one-half inch to two inches for receiving bait fish suitable for fishing for pan fish. Other hooking aperture bodies of different dimensions can be used and their size will depend on the size of the bait fish.

It is within the scope of the invention to make the main caddy body 14 of different sizes to accommodate a particular range of sizes of bait fish. For example, if bait fish larger than four inches, as described above, are desired, a suitably sized main caddy body 14 can be manufactured to accommodate the larger fish. Accordingly, the hooking aperture body 16 for the larger main caddy body can also be manufactured to accommodate the larger bait fish. Therefore, it is possible to size the main caddy body for a particular range of bait fish sizes and, accordingly, size the hooking aperture bodies for a particular size main caddy body to accommodate the varied bait fish sizes within the desired range.

The various hooking aperture bodies are of the same basic construction and are preferably formed of transparent plastic as is best shown in FIG. 1, 3, and 4–8. With respect to the hooking aperture bodies 16a–16c of FIGS. 3, 4 and 7, each hooking aperture body comprises opposed side walls 52, 58 and opposed monoleaf spring assemblies 42, 43. The opposed side walls 52, 58 and opposed monoleaf spring assemblies 42, 43 can be formed separately and bonded together, but are preferably formed as a single piece. The opposed sidewalls 52, 58 terminate in tapered nose portions 56 and 57. Each hooking aperture body will have a funnel entrance end 40 of a size to be forced into the exit opening 26 of the main caddy body 14. This will provide a firm connection between the main caddy body and the respective hooking aperture body. The funnel entrance end appears as an exit window to the bait fish. Preferably, the hooking aperture body will snap-fit into the main caddy body 14.

Figure 2:
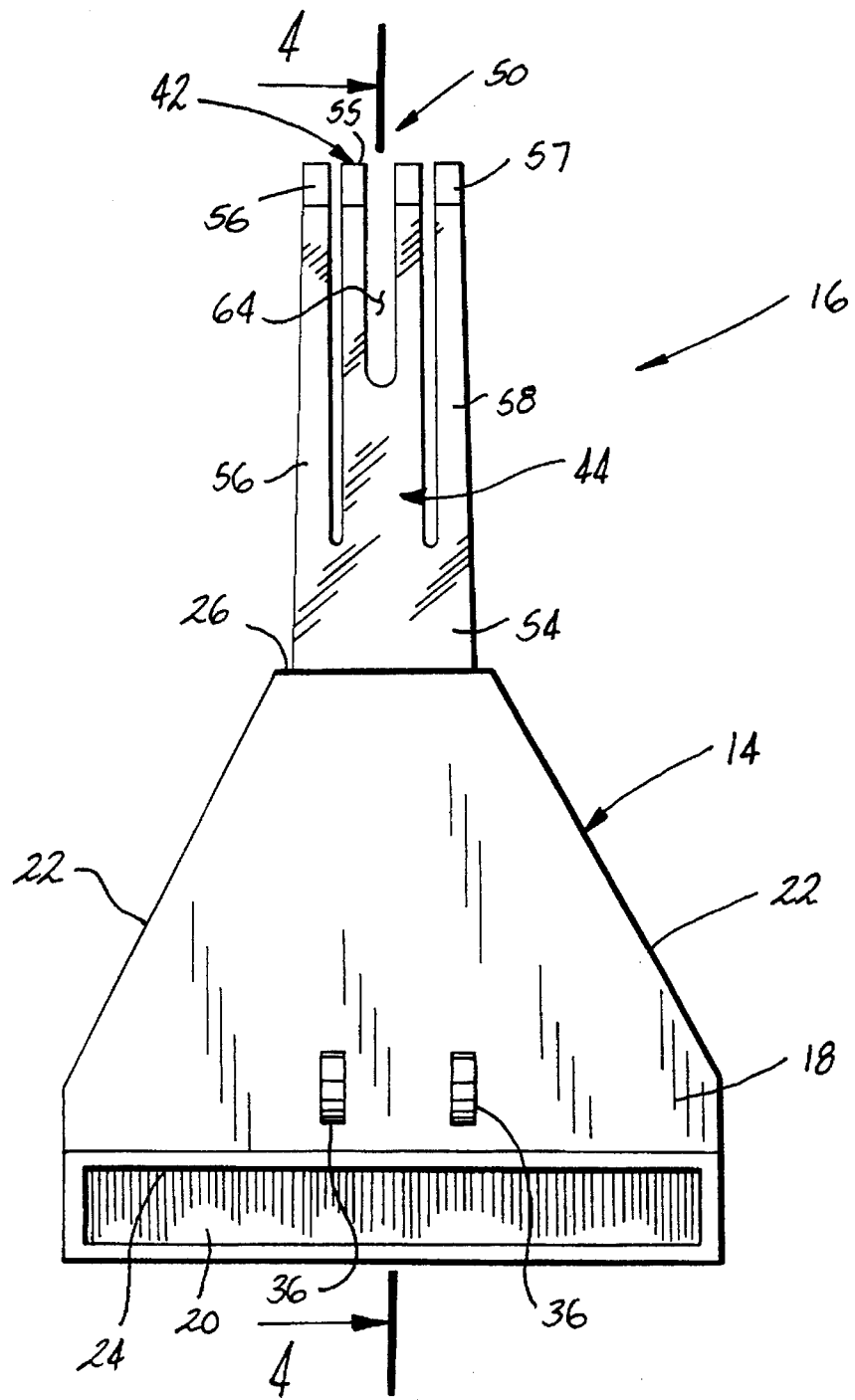
FIG. 2 is a top plan view of the minnow caddy of FIG. 1 with the handle removed.
Figure 7:
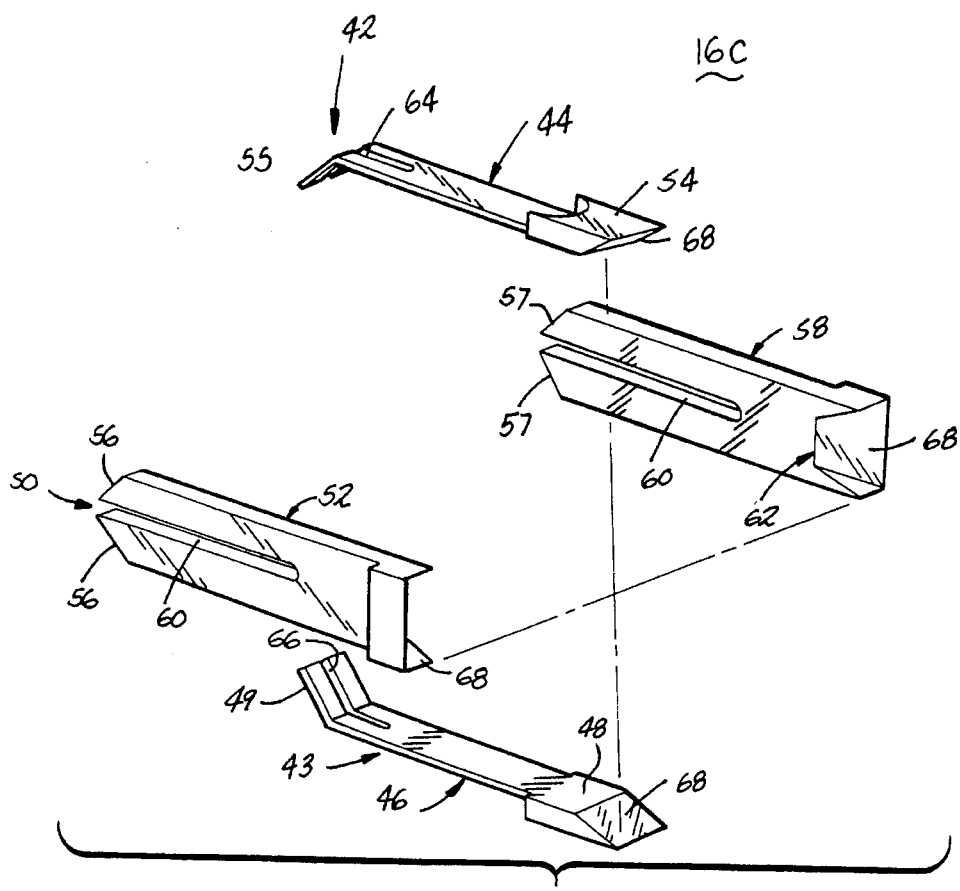
FIG. 7 is an exploded view of the hooking aperture body of FIG. 4 which is glued or preferably molded into one unit.

The forward part of each of the hooking aperture bodies will include a nose or exit gate end 50 (FIGS. 4, 5 and 8) in the form of opposed monoleaf spring gate assemblies generally identified by the numerals 42, 43, as shown in FIGS. 2, 4 and 7. Each monoleaf spring assemblies 42, 43 will be formed from opposing monoleaf springs 44, 46, respectively. The monoleaf spring 46 is the lower spring and includes a spring plate 48 cast integral with the hooking aperture body, terminating in an upward tapered nose gate 49 to parallel the taper of nose portion 56, 57 in each side wall.

The monoleaf spring 44 is disposed uppermost and includes an upper spring plate 54 cast integral with the hooking aperture body, terminating in a downward tapered nose gate 55 to parallel the taper of nose portion 56 in each side wall. A pair of opposed apertures 60, through which a fish hook may be inserted to engage the trapped bait fish in the head or dorsal area, are defined in the side walls 52 and 58 (FIG. 7).

Figure 8:
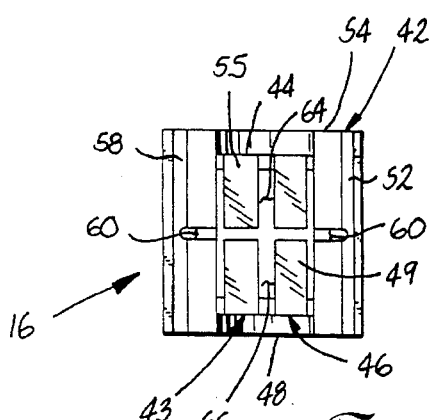
FIG. 8 is a front elevational view of the hooking aperture body of FIG. 4 taken from the left exit gate end thereof.
Figure 6:
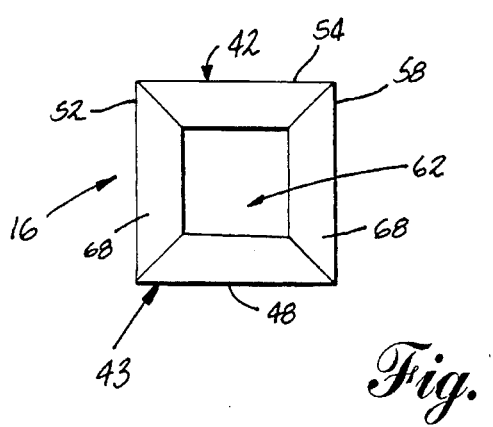
FIG. 6 is an end elevational view of the hooking aperture body of FIG. 4 taken from the right entrance window end thereof.

It will also be seen from FIGS. 6–8 that the tapered nose gates 49, 55 of the monoleaf spring assemblies 42, 43 are provided with aligned vertical slots or hooking apertures 64, 66 through which a fish hook may be inserted and passed through the head area of a bait fish. On the other hand, the apertures 60 also permit the fish hook to be inserted into the bait fish under the dorsal fin or through the tail area. The vertical slots 64, 66 can extend along the upper and lower monoleaf springs 44, 46 in a manner similar to apertures 60.

Referring to FIGS. 2 and 8, it can be seen that the hooking aperture body tapers inwardly from the entrance funnel end 40 to the exit gate end 50. The hooking aperture body 16 is tapered for ease of manufacturing so the hooking aperture body is more easily removed from the mold or die. However, it is within the scope of the invention for the hooking aperture body to have parallel sides without any inward tapering. It is also within the scope of the invention for the opposed side walls 52, 58 to have an arcuate or curved cross section instead of the vertical or planar cross sections as illustrated. The arcuate or curved cross sections would provide the side walls with greater strength.

The entrance funnel end 40 of each of the hooking aperture bodies 16, as seen from FIGS. 6–8, will include a funnel entrance window 62 and a translucent window frame 68, which the bait fish see as an exit window and swim into the hooking aperture body and are trapped.

Operation

Figure 5:
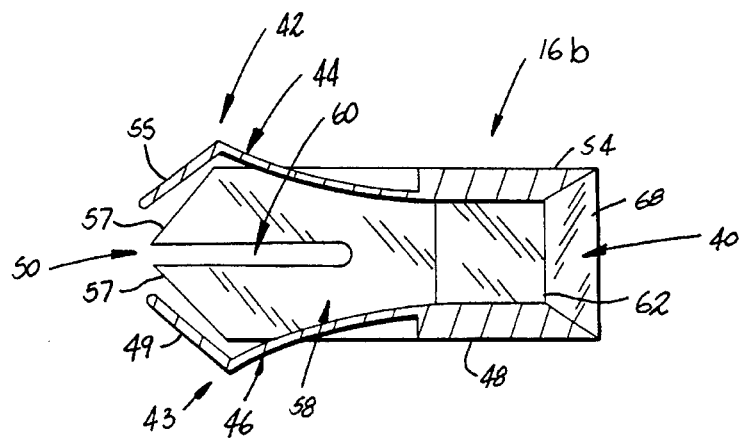
FIG. 5 is a side elevational view of the same hooking aperture body having the same overall length of the hooking aperture body shown in FIG. 4, the monoleaf spring gate being shown in its open position.

The minnow caddy 10 is casually placed into and on the bottom of a bait receptacle by handle 12. The minnow caddy 10 is placed on the bottom of the container so the bait fish will not congregate under the minnow caddy 10. The bait fish immediately see the dark interior of the main caddy body 14 as a hiding place and swim into the interior of the caddy body 14, where there is inserted a hooking aperture body 16 in caddy body exit opening 26. The hooking aperture body 16 is formed of transparent light transmitting plastic which cause the minnow to see this window as an exit opening. As the bait fish enter the opening, which is actually a trap, they are unable to swim backwards causing them to remain there trapped, but still able to breath. Utilizing the control handle 12, the minnow caddy can be lifted out of the receptacle causing the entrance opening 24 of the main caddy body 14 to rotate upwardly on the pivot pin 34. Gravity causes the water to rush out of the main caddy body 14 through the hooking aperture body 16. This water and pressure forces a minnow in the main caddy body 14 to enter into the hooking aperture 16 and remain trapped therein in a position such as that shown in FIG. 1, head first and right side up, so that the fish hooks, such as the fish hook. 70 of FIG. 1, can be inserted through the bait fish 72. The bait fish may then be drawn out of the exit gate end 50. As the bait fish are drawn out of the hooking aperture body 16, the monoleaf springs 44 and 46 are flexed apart by the bait fish as is shown in FIGS. 1, 5 and 7.

Although a preferred embodiment of the minnow caddy has specifically been illustrated and described, it is to be understood that variations may be made in the minnow caddy without departing from the spirit and scope of the invention as defined by the appended claims. For example, it is within the scope of the invention for the varied hooking aperture bodies to have a different external size. It is also within the scope of the invention for the different external size hooking aperture bodies to have an internal size proportional to their external size to accommodate different size bait fish.

The embodiments for which an exclusive property or privilege is claimed are defined as follows:

1. A bait fish trap for use in catching bait fish in a bait container and comprising, a structurally rigid caddy body formed of axially extending walls defining a hiding place and having a flat bottom surface adapted to lie flat against a bottom of a bait container when the bait fish trap is disposed within a bait container, said caddy body having an entrance opening at one axial end through which fish can enter when the bottom surface is disposed against a bottom surface of a container and an exit opening at another axial end, and a hooking aperture body having a spring gate fitted into said exit end and defining what appears to be an exit from said hiding place, said gate comprising multiple resilient leaves for trapping and holding a bait fish exiting said caddy body, and said gate having at least one hook receiving groove for receiving a fish hook to be applied to a trapped bait fish.

2. A bait fish trap according to claim 1 wherein said gate is replaceably carried by said caddy body.

3. A bait fish trap according to claim 1 wherein said gate is replaceably carried by said caddy body for replacement by a like gate of different size whereby said minnow scoop is adaptable to receive bait fish of different sizes.

4. A bait fish trap according to claim 1 wherein the caddy body is substantially opaque and the gate is substantially transparent.

5. A bait fish trap according to claim 1 wherein said multiple leaves are arranged in opposed relation for separation to release a trapped bait fish from said gate.

6. A bait fish trap according to claim 1 together with a handle pivotally connected to said caddy body for positioning said bait fish trap within a bait container.

7. A bait fish trap according to claim 6 wherein said caddy body includes a top and a bottom, and said bottom extends beyond said top at said entrance end.

8. A bait fish trap according to claim 6 wherein said caddy body is of a constant height.

9. A bait fish trap according to claim 6 wherein said handle is pivotally connected to said caddy body adjacent said entrance end for positioning said minnow scoop within a bait container.

10. A bait fish trap according to claim 1 wherein the spring gate is replaceably carried by said caddy body through a telescoping snap-fit connection.

11. A bait fish trap according to claim 10 wherein said gate is replaceable by a like gate of different size, whereby said bait fish trap is adaptable to receive bait fish of different sizes.

12. A bait fish trap according to claim 10 wherein said gate includes a rear tubular body portion of a size and cross section for engagement in said caddy body exit opening, and said multiple leaves are carried by and extend from said tubular body portion.

13. A bait fish trap according to claim 10 and further comprising a handle pivotally connected to said caddy body for positioning said bait fish trap within a bait container.

14. A bait fish trap according to claim 10 wherein said caddy body entrance opening is wider than said exit opening and said caddy body tapers in width from the entrance opening to said exit opening.

15. A bait fish trap according to claim 1 wherein said gate includes a rear body portion of a size and cross section for engagement in said caddy body exit opening and said multiple leaves are carried by and extend from said rear body portion.

16. A bait fish trap according to claim 15 wherein said gate and rear body portion are of a one piece plastic construction.

17. A bait fish trap according to claim 16 wherein said rear body portion is rectangular in cross section having plural sides and said multiple leaves extend in opposed relation from at least two of said sides.

18. A bait fish trap according to claim 1 wherein said caddy body entrance opening is wider than said exit opening and said caddy body tapers in width from the wide entrance opening to said exit opening.

19. A bait fish trap comprising a caddy body formed by an axially extending top wall defining a hiding place and an axially extending bottom wall, adapted to lie flat against a container bottom, said caddy body having an entrance opening at one axial end through which fish can enter when the bottom wall is disposed against a bottom surface of a container and an exit opening at another axial end, and a hooking aperture body having a gate fitted into said exit opening and defining what appears to be an exit from said hiding place, said gate comprising a body portion of a size and cross section for engagement in said caddy body open exit end, said body portion is rectangular in cross section having plural sides and multiple resilient leaves for trapping and holding a bait fish exiting said caddy body, said resilient leaves extend in opposed relation from at least two of the plural sides of the body portion, and said gate has at least one hook receiving groove for receiving a fish hook to be applied to a trapped bait fish.

20. A bait fish trap for use in catching bait fish in a bait container and comprising a structurally rigid caddy body formed of axially extending walls defining a hiding place and having a bottom surface adapted to lie flat against a bottom of a bait container when the bait fish trap is disposed within a bait container, said caddy body having an entrance opening at one axial end through which fish can enter when the bottom surface is disposed against a bottom surface of a container and an exit opening at another axial end, and a hooking aperture body having a spring gate fitted into said exit end and defining what appears to be an exit from said hiding place, said gate comprising a rectangular in cross section rear body portion of one piece plastic construction with said gate, said body portion having plural sides and being of a size and cross section for engagement in said caddy body exit opening, multiple resilient leaves carried by and extending from said rear body portion in opposed relation from at least two of said plural sides for trapping and holding a bait fish exiting said caddy body, and said gate having at least one hook receiving groove for receiving a fish hook to be applied to a trapped bait fish.

21. A bait fish trap for use in catching bait fish in a bait container and comprising a structurally rigid caddy body formed of axially extending walls defining a hiding place and having a bottom surface adapted to lie flat against a bottom of a bait container when the bait fish trap is disposed within a bait container, said caddy body having an entrance opening at one axial end through which fish can enter when the bottom surface is disposed against a bottom surface of a container and an exit opening at another axial end, and a hooking aperture body having a spring gate fitted into said exit end and defining what appears to be an exit from said hiding place, said gate comprising a rectangular in cross section rear body portion of one piece plastic construction with said gate, said body portion having plural sides, which are arcuate in cross section, and the rear body portion being of a size and cross section for engagement in said caddy body exit opening, multiple resilient leaves carried by and extending from said rear body portion in opposed relation from at least two of said plural sides for trapping and holding a bait fish exiting said caddy body, and said gate having at least one hook receiving groove for receiving a fish hook to be applied to a trapped bait fish.

* * * * *